(12) United States Patent
Chen et al.

(10) Patent No.: US 11,385,767 B2
(45) Date of Patent: Jul. 12, 2022

(54) METHOD OF PRESENTING USER INTERFACE, APPARATUS FOR PRESENTING USER INTERFACE, AND COMPUTER-PROGRAM PRODUCT

(71) Applicants: BEIJING BOE DISPLAY TECHNOLOGY CO., LTD., Beijing (CN); BOE Technology Group Co., Ltd., Beijing (CN)

(72) Inventors: Qifei Chen, Beijing (CN); Liangliang Ren, Beijing (CN); Zhetao Xu, Beijing (CN); Xiaofeng Liu, Beijing (CN); Xing Zhou, Beijing (CN); Kun Lu, Beijing (CN); Guannan Song, Beijing (CN); Laiyou Cui, Beijing (CN)

(73) Assignees: BEIJING BOE DISPLAY TECHNOLOGY CO., LTD., Beijing (CN); BOE Technology Group Co., Ltd., Beijing (CN)

(*) Notice: Subject to any disclaimer, the term of this patent is extended or adjusted under 35 U.S.C. 154(b) by 480 days.

(21) Appl. No.: 16/344,017

(22) PCT Filed: Nov. 23, 2018

(86) PCT No.: PCT/CN2018/117176
§ 371 (c)(1),
(2) Date: Apr. 22, 2019

(87) PCT Pub. No.: WO2019/169906
PCT Pub. Date: Sep. 12, 2019

(65) Prior Publication Data
US 2021/0326009 A1 Oct. 21, 2021

(30) Foreign Application Priority Data
Mar. 9, 2018 (CN) .......................... 201810195860.3

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 3/04886* (2013.01); *G06F 2203/04803* (2013.01)

(58) Field of Classification Search
CPC .... G06F 3/0482; G06F 3/0481; G06F 3/0486; G06F 3/04886; G06F 2203/04803
See application file for complete search history.

(56) References Cited

U.S. PATENT DOCUMENTS

2009/0177981 A1* 7/2009 Christie .............. G06F 3/04883 715/758
2011/0185317 A1* 7/2011 Thimbleby ......... G06F 3/04883 715/863

(Continued)

FOREIGN PATENT DOCUMENTS

| CN | 101217517 A | 7/2008 |
|---|---|---|
| CN | 103605524 A | 2/2014 |

(Continued)

OTHER PUBLICATIONS

First Office Action in the Chinese Patent Application No. 201810195860.3, dated Oct. 10, 2020; English translation attached.
(Continued)

*Primary Examiner* — Claudia Dragoescu
(74) *Attorney, Agent, or Firm* — Intellectual Valley Law, P.C.

(57) ABSTRACT

A method of presenting a user interface object. The method includes providing data to a display panel of an electronic device having a memory and one or more processors to concurrently display a plurality of user interface objects in
(Continued)

a user interface, the plurality of user interface objects including a plurality of menu user interface objects and a plurality of user interface control objects, the plurality of menu user interface objects including at least a first menu user interface object and a second menu user interface object, and the plurality of user interface control objects including at least a first user interface control object and a second user interface control object.

15 Claims, 9 Drawing Sheets

(51) Int. Cl.
*G06F 3/0486* (2013.01)
*G06F 3/04886* (2022.01)

(56) References Cited

U.S. PATENT DOCUMENTS

2013/0072262 A1* 3/2013 Mhun ................ G06F 3/04886
                                                              455/566
2014/0351748 A1   11/2014 Xia et al.
2015/0095840 A1*  4/2015 Soshin ................ G06F 3/0481
                                                              715/781
2019/0124021 A1*  4/2019 DeMattei .............. G06F 3/0488

FOREIGN PATENT DOCUMENTS

| | | |
|---|---|---|
| CN | 103795607 A | 5/2014 |
| CN | 104035683 A | 9/2014 |
| CN | 104391625 A | 3/2015 |
| CN | 105022599 A | 11/2015 |
| CN | 107515710 A | 12/2017 |
| EP | 2571234 A1 | 3/2013 |

OTHER PUBLICATIONS https://jingyan.baidu.com/article/7c6fb428d3966980652c9078.html, How to search content in Baidu Experience Group Announcements.

International Search Report & Written Opinion dated Feb. 26, 2019, regarding PCT/CN2018/117176.

* cited by examiner

Providing data to a display panel of an electronic device having a memory and one or more processors to concurrently display a plurality of user interface objects in a user interface, the plurality of user interface objects including a plurality of menu user interface objects and a plurality of user interface control objects, the plurality of menu user interface objects including at least a first menu user interface object and a second menu user interface object, and the plurality of user interface control objects including at least a first user interface control object and a second user interface control object

Generating a first triggering signal in response to a first user action including dragging the first menu user interface object to a position occupied by the first user interface control object

Configuring the first user interface control object to correspond to the first menu user interface object in response to the first triggering signal

Generating a second triggering signal in response to a second user action including dragging the second menu user interface object to a position occupied by the second user interface control object

Configuring the second user interface control object to correspond to the second menu user interface object in response to the second triggering signal

FIG. 2

Providing data to a display panel of an electronic device having a memory and one or more processors to concurrently display a user interface having a plurality of user interface objects, the plurality of user interface objects including a plurality of menu user interface objects and a plurality of user interface control objects, the plurality of menu user interface objects including at least a first menu user interface object and a second menu user interface object, and the plurality of user interface control objects including at least a first user interface control object and a second user interface control object

↓

Generating a first triggering signal in response to a first user action including dragging the first menu user interface object to a position occupied by the first user interface control object

↓

Configuring the first user interface control object to correspond to the first menu user interface object in response to the first triggering signal

↓

Generating a second triggering signal in response to a second user action including dragging the second menu user interface object to a position occupied by the second user interface control object

↓

Configuring the second user interface control object to correspond to the second menu user interface object in response to the second triggering signal

↓

Receiving a messaging signal from the one or more contact objects

↓

Displaying the messaging signal in a respective one of the one or more messaging window objects

FIG. 5

```
┌─────────────────────────────────────────────────────────────────────────┐
│ Providing data to a display panel of an electronic device having a      │
│ memory and one or more processors to concurrently display a user        │
│ interface having a plurality of user interface objects, the plurality   │
│ of user interface objects including a plurality of menu user interface  │
│ objects and a plurality of user interface control objects, the          │
│ plurality of menu user interface objects including at least a first     │
│ menu user interface object and a second menu user interface object,     │
│ and the plurality of user interface control objects including at least  │
│ a first user interface control object and a second user interface       │
│ control object                                                          │
└─────────────────────────────────────────────────────────────────────────┘
                                   │
                                   ▼
┌─────────────────────────────────────────────────────────────────────────┐
│ Generating a first triggering signal in response to a first user action │
│ including dragging the first menu user interface object to a position   │
│ occupied by the first user interface control object                     │
└─────────────────────────────────────────────────────────────────────────┘
                                   │
                                   ▼
┌─────────────────────────────────────────────────────────────────────────┐
│ Configuring the first user interface control object to correspond to    │
│ the first menu user interface object in response to the first           │
│ triggering signal                                                       │
└─────────────────────────────────────────────────────────────────────────┘
                                   │
                                   ▼
┌─────────────────────────────────────────────────────────────────────────┐
│ Generating a second triggering signal in response to a second user      │
│ action including dragging the second menu user interface object to a    │
│ position occupied by the second user interface control object           │
└─────────────────────────────────────────────────────────────────────────┘
                                   │
                                   ▼
┌─────────────────────────────────────────────────────────────────────────┐
│ Configuring the second user interface control object to correspond to   │
│ the second menu user interface object in response to the second         │
│ triggering signal                                                       │
└─────────────────────────────────────────────────────────────────────────┘
                                   │
                                   ▼
┌─────────────────────────────────────────────────────────────────────────┐
│ Generating a seventh triggering signal in response to a seventh user    │
│ action including clicking on the one or more input window objects       │
└─────────────────────────────────────────────────────────────────────────┘
                                   │
                                   ▼
┌─────────────────────────────────────────────────────────────────────────┐
│ Starting a user interface control object adjustment control in response │
│ to the seventh triggering signal                                        │
└─────────────────────────────────────────────────────────────────────────┘
```

FIG. 6

METHOD OF PRESENTING USER INTERFACE, APPARATUS FOR PRESENTING USER INTERFACE, AND COMPUTER-PROGRAM PRODUCT

CROSS-REFERENCE TO RELATED APPLICATION

This application is a national stage application under 35 U.S.C. § 371 of International Application No. PCT/CN2018/117176, filed Nov. 23, 2018, which claims priority to Chinese Patent Application No. 201810195860.3, filed Mar. 9, 2018, the contents of which are incorporated by reference in the entirety.

TECHNICAL FIELD

The present invention relates to communication technology, more particularly, to a method of presenting a user interface object, an apparatus for presenting a user interface object, and a computer-program product.

BACKGROUND

With the development of the internet technology and mobile communication technology, various instant messaging (IM) technologies have emerged. For example, WeChat® as an instant messaging tool has been developed, with functions such as real-time input display and cross-platform communication. When WeChat® is installed on a client device, a user may log on the WeChat®, open a session interface, and chat with a buddy. With the WeChat®, the user may also participate in group chats, or find new buddies nearby to talk to. WeChat® also allows companies, brands and celebrities to register public IDs on a public platform, and provide information and services such as news update, company announcements, seminars, and merchandise information to the private IDs.

SUMMARY

In one aspect, the present invention provides a method of presenting a user interface object, comprising providing data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object; generating a first triggering signal in response to a first user action comprising dragging the first menu user interface object to a position occupied by the first user interface control object; configuring the first user interface control object to correspond to the first menu user interface object in response to the first triggering signal; generating a second triggering signal in response to a second user action comprising dragging the second menu user interface object to a position occupied by the second user interface control object; and configuring the second user interface control object to correspond to the second menu user interface object in response to the second triggering signal.

Optionally, the plurality of menu user interface objects comprise one or more contact objects, and the plurality of user interface control objects comprise one or more messaging window objects.

Optionally, the plurality of user interface control objects further comprise a first virtual redirection button; wherein the method further comprises generating a third triggering signal in response to a third user action comprising clicking on the first virtual redirection button; reading a cached first reading data or a cached initialized reading data, generating a first reading interface signal based on a combination of the third triggering signal and the cached first reading data or a combination of the third triggering signal and the cached initialized reading data, and concurrently caching a first messaging data of the one or more messaging window objects to generate a cached first messaging data; and displaying a plurality of first reading interface objects based on the first reading interface signal.

Optionally, the plurality of first reading interface objects comprising a second virtual redirection button; wherein the method further comprises generating a fourth triggering signal in response to a fourth user action comprising clicking on the second virtual redirection button; reading the cached first messaging data based on the fourth triggering signal, and concurrently caching a second reading data of the plurality of first reading interface objects; and displaying the one or more messaging window objects based on the cached first messaging data.

Optionally, the plurality of menu user interface objects further comprises one or more public platform objects; wherein the method further comprises generating a fifth triggering signal in response to a fifth user action comprising clicking on the one or more public platform objects; reading a cached third reading data or a cached initialized reading data, generating a second reading interface signal based on a combination of the fifth triggering signal and the cached third reading data or a combination of the fifth triggering signal and the cached initialized reading data, and concurrently caching a second messaging data of the one or more messaging window objects to generate a cached second messaging data; and displaying a plurality of second reading interface objects based on the second reading interface signal.

Optionally, the method further comprises generating a sixth triggering signal in response to a sixth user action comprising clicking on the second virtual redirection button; reading the cached second messaging data based on the sixth triggering signal, and concurrently caching a fourth reading data of the plurality of second reading interface objects; and displaying the one or more messaging window objects based on the cached second messaging data.

Optionally, the first user interface control object is a main user interface control object; the second user interface control object is a subordinate user interface control object; and the first user interface control object and the second user interface control object are adjacent to each other.

Optionally, the one or more messaging window objects comprises one or more input window objects; wherein the method further comprises generating a seventh triggering signal in response to a seventh user action comprising clicking on the one or more input window objects; and starting a user interface control object adjustment control in response to the seventh triggering signal.

Optionally, the method further comprises receiving a messaging signal from the one or more contact objects; and displaying the messaging signal in a respective one of the one or more messaging window objects.

Optionally, the method further comprises resetting the plurality of user interface control objects upon a user logging on successfully.

In another aspect, the present invention provides an apparatus for presenting a user interface object, comprising a display panel; a memory; and one or more processors; wherein the memory and the one or more processors are connected with each other; and the memory stores computer-executable instructions for controlling the one or more processors to provide data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object; generate a first triggering signal in response to a first user action comprising dragging the first menu user interface object to a position occupied by the first user interface control object; configure the first user interface control object to correspond to the first menu user interface object in response to the first triggering signal; generate a second triggering signal in response to a second user action comprising dragging the second menu user interface object to a position occupied by the second user interface control object; and configure the second user interface control object to correspond to the second menu user interface object in response to the second triggering signal.

Optionally, the plurality of menu user interface objects comprise one or more contact objects; the plurality of user interface control objects comprise one or more messaging window objects; and the plurality of user interface control objects further comprise a first virtual redirection button; wherein the memory further stores computer-executable instructions for controlling the one or more processors to generate a third triggering signal in response to a third user action comprising clicking on the first virtual redirection button; and read a cached first reading data or a cached initialized reading data, generating a first reading interface signal based on a combination of the third triggering signal and the cached first reading data or a combination of the third triggering signal and the cached initialized reading data, and concurrently caching a first messaging data of the one or more messaging window objects to generate a cached first messaging data; wherein the display panel is configured to display a plurality of first reading interface objects based on the first reading interface signal.

Optionally, the plurality of first reading interface objects comprising a second virtual redirection button; wherein the memory further stores computer-executable instructions for controlling the one or more processors to generate a fourth triggering signal in response to a fourth user action comprising clicking on the second virtual redirection button; and read the cached first messaging data based on the fourth triggering signal, and concurrently caching a second reading data of the plurality of first reading interface objects; wherein the display panel is configured to display the one or more messaging window objects based on the cached first messaging data.

Optionally, the plurality of menu user interface objects further comprises one or more public platform objects; wherein the memory further stores computer-executable instructions for controlling the one or more processors to generate a fifth triggering signal in response to a fifth user action comprising clicking on the one or more public platform objects; and read a cached third reading data or a cached initialized reading data, generating a second reading interface signal based on a combination of the fifth triggering signal and the cached third reading data or a combination of the fifth triggering signal and the cached initialized reading data, and concurrently caching a second messaging data of the one or more messaging window objects to generate a cached second messaging data; wherein the display panel is configured to display a plurality of second reading interface objects based on the second reading interface signal.

Optionally, the memory further stores computer-executable instructions for controlling the one or more processors to generate a sixth triggering signal in response to a sixth user action comprising clicking on the second virtual redirection button; and read the cached second messaging data based on the sixth triggering signal, and concurrently caching a fourth reading data of the plurality of second reading interface objects; wherein the display panel is configured to display the one or more messaging window objects based on the cached second messaging data.

Optionally, the first user interface control object is a main user interface control object; the second user interface control object is a subordinate user interface control object; and the first user interface control object and the second user interface control object are adjacent to each other.

Optionally, the one or more messaging window objects comprises one or more input window objects; wherein the memory farther stores computer-executable instructions for controlling the one or more processors to generate a seventh triggering signal in response to a seventh user action comprising clicking on the one or more input window objects; and start a user interface control object adjustment control in response to the seventh triggering signal.

Optionally, the memory further stores computer-executable instructions for controlling the one or more processors to receive a messaging signal from the one or more contact objects; wherein the display panel is configured to display the messaging signal in a respective one of the one or more messaging window objects.

Optionally, the memory further stores computer-executable instructions for controlling the one or more processors to reset the plurality of user interface control objects upon a user logging on successfully.

In another aspect, the present invention provides a computer-program product comprising a non-transitory tangible computer-readable medium having computer-readable instructions thereon, the computer-readable instructions being executable by a processor to cause the processor to perform providing data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object; generating a first triggering signal in response to a first user action comprising dragging the first menu user interface object to a position occupied by the first user interface control object; configuring the first user interface control object to correspond to the first menu user interface object in response to the first triggering signal; generating a second triggering signal in response to a second user action comprising dragging the second menu user interface object to a position occupied by the second user interface control object; and configuring the second user interface control object to correspond to the second menu user interface object in response to the second triggering signal.

BRIEF DESCRIPTION OF THE FIGURES

The following drawings are merely examples for illustrative purposes according to various disclosed embodiments and are not intended to limit the scope of the present invention.

FIG. 2 is a flow chat illustrating a method of presenting a user interface object in some embodiments according to the present disclosure.

FIG. 5 is a flow chat illustrating a method of presenting a user interface object in some embodiments according to the present disclosure.

FIG. 6 is a flow chat illustrating a method of presenting a user interface object in some embodiments according to the present disclosure.

DETAILED DESCRIPTION

Figure 1:
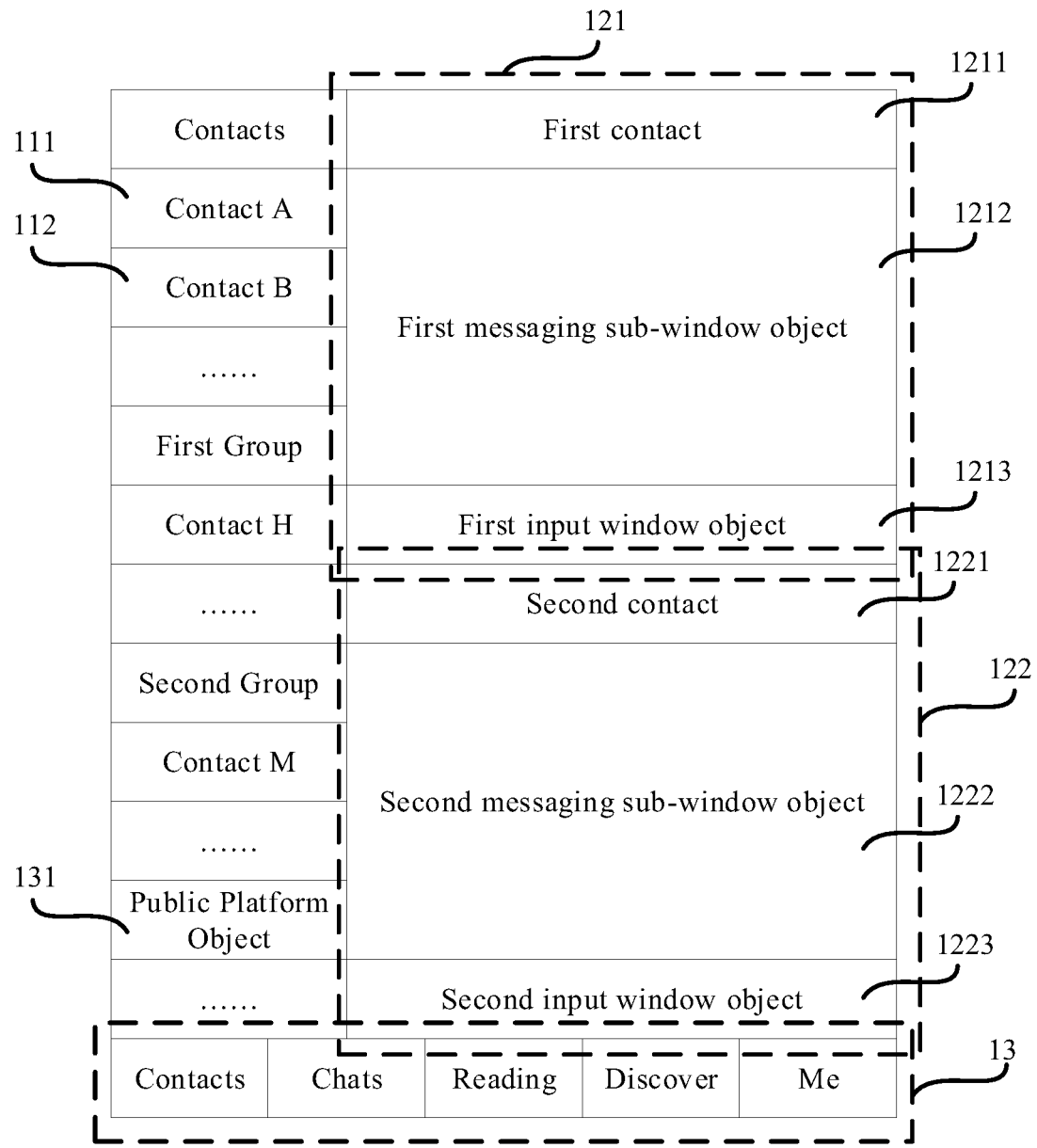
FIG. 1 is a schematic diagram of a user interface in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed, At present, when a user is communicating with a first contact on an IM tool such as WeChat®, the user cannot concurrently communicate with a second contact. For example, if the user is communicating with the first contact, and the user receives a message from the second contact, the user cannot concurrently reply to the second user's message on WeChat®. In order to enter the second contact's messaging window, the user must return to the main interface, and click the second contact's tag, or go to the list of contacts and click the second contact's tag. To communicate with two different contacts, the user has to frequently switch between the first contact's messaging window, the main interface, the list of contact, and the second contact's messaging window. This leads to unsatisfactory user experience.

Accordingly, the present disclosure provides, inter alia, a method of presenting a user interface object, an apparatus for presenting a user interface object, and a computer-program product that substantially obviate one or more of the problems due to limitations and disadvantages of the related art. In one aspect, the present disclosure provides a method of presenting a user interface object that allows a user to concurrently communicate with two or more contacts on an IM tool. In some embodiments, the method includes providing data to a display panel of an electronic device having a memory and one or more processors to concurrently display a plurality of user interface objects in a user interface. The plurality of user interface objects include a plurality of menu user interface objects and a plurality of user interface control objects. The plurality of menu user interface objects include at least a first menu user interface object and a second menu user interface object. The plurality of user interface control objects include at least a first user interface control object and a second user interface control object. The method optionally further includes generating a first triggering signal in response to a first user action including dragging the first menu user interface object to a position occupied by the first user interface control object; configuring the first user interface control object to correspond to the first menu user interface object in response to the first triggering signal; generating a second triggering signal in response to a second user action including dragging the second menu user interface object to a position occupied by the second user interface control object; and configuring the second user interface control object to correspond to the second menu user interface object in response to the second triggering signal.

FIG. 1 is a schematic diagram of a user interface in some embodiments according to the present disclosure. The user interface includes a plurality of user interface objects, wherein the plurality of user interface objects include a plurality of menu user interface objects and a plurality of user interface control objects. Optionally, the plurality of menu user interface objects includes at least a first menu user interface object and a second menu user interface object. Optionally, the plurality of user interface control objects includes at least a first user interface control object and a second user interface control object. Referring to FIG. 1, the plurality of menu user interface objects include one or more contact objects including a first contact object 111 (Contact A), a second contact object 112 (Contact B). The plurality of user interface control objects include one or more messaging window objects including a first messaging window object 121 and a second messaging window object 122. Optionally, the first messaging window object 121 includes a first display bar object 1211 displaying information including information of a first contact, a first messaging sub-window object 1212 displaying messages communicated with the first contact, and a first input window object 1213 for inputting messages and other operations. Optionally, the second messaging window object 122 includes a second display bar object 1221 displaying information including information of a second contact, a second messaging sub-window object 1222 displaying messages communicated with the second contact, and a second input window objects 1223 for inputting messages and other operations, In some embodiments, the plurality of menu user interface objects further include a plurality of public platform objects 131 (e.g., public IDs on WeChat®). In some embodiments, the plurality of user interface control objects include a menu bar object 13. Optionally, the menu bar object 13 includes a plurality of button objects, for example one of the plurality of button objects is Contacts, another one of the plurality of button objects is Chats, another one of the plurality of button objects is Reading, another one of the plurality of button objects is Discover, and another one of the plurality of button objects is Me.

In some embodiments, depending on a screen size of a mobile apparatus and user needs, the user interface may be configured to obtain three or more messaging window objects. Optionally, the shapes of the plurality of menu user interface objects and the shapes of the plurality of user interface control objects can be adjusted to fit the size of the screen or the user needs. For example, the plurality of contact objects may adopt various appropriate shapes, and the messaging window objects may adopt various appropriate shapes. Optionally, the positions of the plurality of menu user interface objects and the positions of the plurality of user interface control objects can be adjusted to fit in the screen or the user needs, Optionally, the messaging window objects can be configured to have multiple types of user interface objects, wherein the multiple types of objects may be combined in various appropriate manners. Optionally, the menu bar object 13 may be omitted. Optionally, the menu bar object 13 may further include other user interface objects commonly used in mobile communication. Optionally, the user interface includes at least two of the plurality of menu user interface objects and at least two of the plurality of user interface control Objects.

FIG. 2 is a flow chat illustrating a method of presenting a user interface object in some embodiments according to the present disclosure. Referring to FIG. 2, the method in some embodiments includes providing data to a display panel of an electronic device having a memory and one or more processors to concurrently display a plurality of user interface Objects in a user interface, the plurality of user interface objects including a plurality of menu user interface objects and a plurality of user interface control objects, the plurality of menu user interface objects including at least a first menu user interface object and a second menu user interface object, and the plurality of user interface control objects including at least a first user interface control object and a second user interface control object. In some embodiments, the method of presenting a user interface object further includes generating a first triggering signal in response to a first user action including dragging the first menu user interface object to a position occupied by the first user interface control object, configuring the first user interface control object to correspond to the first menu user interface object in response to the first triggering signal, generating a second triggering signal in response to a second user action including dragging the second menu user interface object to a position occupied by the second user interface control object, and configuring the second user interface control object to correspond to the second menu user interface object in response to the second triggering signal.

In some embodiments, the first user interface control object is a main user interface control object, the second user interface control object is a subordinate user interface control object. Optionally, the first user interface control object and the second user interface control object are adjacent to each other. As used herein, the term "subordinate" in the context of user interface control objects refers to a user interface control object that has a priority lower than the main user interface control object. For example, one of the plurality of user interface objects may be used to communicate with an important contact, and the remaining ones of the plurality of user interface objects may be used to communicate with secondary contacts. Therefore, when the user wants to communicate with secondary contacts, she or he need not exit the one of the plurality of user interface objects for communicating with the important contact to switch to the remaining ones of the plurality of user interface objects for communicating with the secondary contacts. The user can concurrently communicate with the important contact and the secondary contacts. Optionally, the user can switch between the remaining ones of the plurality of user interface objects for communicating with secondary contracts, while maintaining the one of the plurality of user interface objects for communicating with the important contact at all time. Frequent switching among multiple user interface objects for multiple contacts can be avoided, and less user operations are required, leading to an enhanced user experience. Optionally, the user can also switch among several ones of the plurality of user interface objects including the one of the plurality of user interface Objects communicating with important contact and the remaining ones of the plurality of user interface objects communicating with secondary contacts, thereby meeting the user's operation habit and needs.

Figure 3:
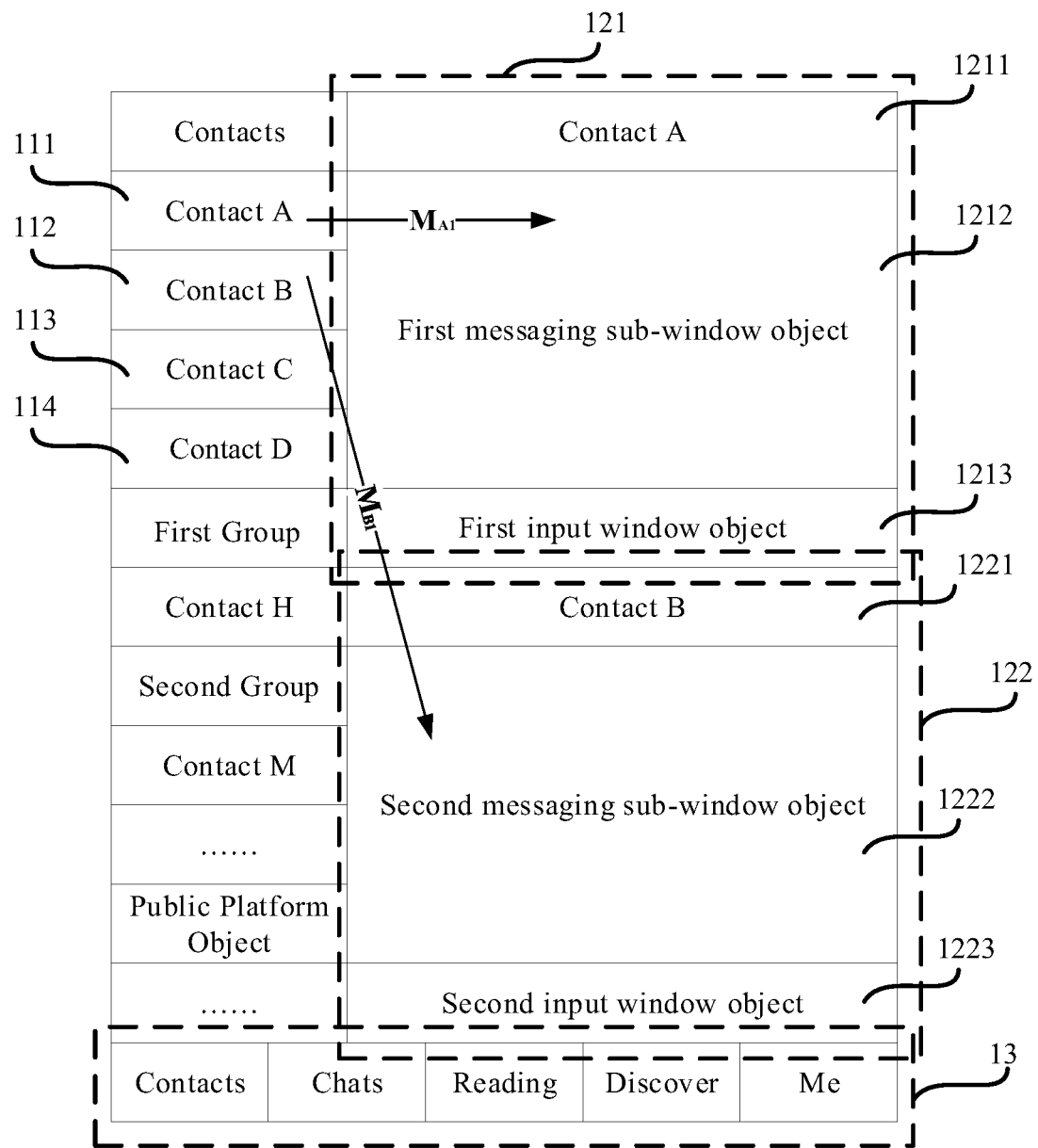
FIG. 3 is a schematic diagram of a user interface in some embodiments according to the present disclosure.

FIG. 3 is a schematic diagram of a user interface in some embodiments according to the present disclosure. Referring to FIG. 3, the plurality of menu user interface objects include one or more contact objects including a first contact object 111 (Contact A), a second contact object 112 (Contact B), a third contact object 113 (Contact C), and a fourth contact object 114 (Contact D). The plurality of user interface control objects include one or more messaging window objects including a first messaging window object 121 and a second messaging window object 122.

Referring to both FIG. 2 and FIG. 3, the user communicates with the contact A, the contact B, the contact C, the contact D. In one example, the user communications frequently with the contact A, but infrequently with the contact B, the contact C, and the contact D. The contact A may be assigned as an important contact, and the first messaging window object 121 is designated for communicating with the contact A.

In some embodiments, when the user drags the contact A from the plurality of contact objects to a position occupied by the first messaging window object 121, a touch sensor senses the first user action $M_{A1}$ which is dragging the contact A from the plurality of contact objects to a position occupied by the first messaging window object 121 and thereby sends a first notification to a processor. In response to the first notification, the processor generates a first triggering signal. Based on the first triggering signal, the processor generates data on information regarding the contact A for the display panel and configures the information regarding the contact A to the first messaging window object 121. Accordingly, the information of the contact A is displayed in the position occupied by the first messaging window object 121.

In some embodiments, when the user drags the contact B from the plurality of contact objects to a position occupied by the second messaging window object 122, the touch sensor senses the second user action $M_{B1}$ which is dragging the contact B from the plurality of contact objects to a position occupied by the second messaging window object 122 and thereby sends a second notification to the processor. In response to the second notification, the processor generates a second triggering signal. Based on the second triggering signal, the processor generates data on information regarding the contact B for the display panel and configures the information regarding the contact B to the second messaging window object 122. Accordingly, the information regarding the contact B is displayed in the position occupied by the second messaging window object 122.

In some embodiments, subsequent to configuring information regarding the contact A and information regarding the contact B respectively to the first messaging window objects 121 and the second messaging window object 122, the user can drag the contact C or contact D to the second messaging window object 122 to perform the switch between contact B and contact C or D. If it is necessary to continue to communicate with contact B, the user can again drag the contact B to the second messaging window object 122 to switch back to the communication with contact B.

In some embodiments, a user interface is configured to have at least two of the plurality of user interface control objects. By monitoring the user action of dragging one of the contacts to any one of the plurality of user interface control objects, the configuration of the plurality of user interface control objects is activated by the user actions. Therefore, there is no need to switch back to the home page in order to communicate with multiple contacts at the same time. Rather, the user can switch between contacts by simple operations.

Figure 4:
FIG. 4 is a flow chat illustrating a method of presenting a user interface object in some embodiments according to the present disclosure.

FIG. 4 is a flow chat illustrating a method of presenting a user interface object in some embodiments according to the present disclosure. Referring to FIG. 4, the method of presenting a user interface object further includes resetting the plurality of user interface control objects upon a user logging on successfully. For example, subsequent to a successful log on by the user, the initial setting resets the plurality of user interface control objects, Optionally, the initial setting configures the data regarding the contacts last presented by ones of the plurality of user interface control objects to the respective ones of the plurality of user interface control objects. Optionally, the initial setting configures the data regarding the contact with highest communicating frequency to a main user interface control object of the plurality of user interface control objects. Subsequent to a successful log on, the method of presenting a user interface object further includes providing data to a display panel of an electronic device having a memory and one or more processors to concurrently display a plurality of user interface objects in a user interface. The plurality of user interface objects includes a plurality of menu user interface objects and a plurality of user interface control objects, the plurality of menu user interface objects includes at least a first menu user interface object and a second menu user interface object, and the plurality of user interface control objects includes at least a first user interface control object and a second user interface control object. In some embodiments, the method of presenting a user interface object further includes generating a first triggering signal in response to a first user action including dragging the first menu user interface object to a position occupied by the first user interface control object, configuring the first user interface control object to correspond to the first menu user interface object in response to the first triggering signal, generating a second triggering signal in response to a second user action including dragging the second menu user interface object to a position occupied by the second user interface control object, and configuring the second user interface control object to correspond to the second menu user interface object in response to the second triggering signal.

FIG. 5 is a flow chat illustrating a method of presenting a user interface object in some embodiments according to the present disclosure. Referring to FIG. 5, the method of presenting a user interface object includes providing data to a display panel of an electronic device having a memory and one or more processors to concurrently display a user interface having a plurality of user interface objects. The plurality of user interface objects include a plurality of menu user interface objects and a plurality of user interface control objects. The plurality of menu user interface objects include at least a first menu user interface object and a second menu user interface object. The plurality of user interface control objects include at least a first user interface control object and a second user interface control object. In some embodiments, the method of presenting a user interface object further includes generating a first triggering signal in response to a first user action including dragging the first menu user interface object to a position occupied by the first user interface control object, configuring the first user interface control object to correspond to the first menu user interface object in response to the first triggering signal, generating a second triggering signal in response to a second user action including dragging the second menu user interface object to a position occupied by the second user interface control object, and configuring the second user interface control object to correspond to the second menu user interface object in response to the second triggering signal. In some embodiments, the method of presenting a user interface object further includes receiving a messaging signal from the one or more contact objects; and displaying the messaging signal in a respective one of the one or more messaging window objects.

Comparing the method of presenting a user interface object in FIG. 5 with the method of present a user interface object in FIG. 2, the method in FIG. 2 focuses on the user interface object control, and a stand-alone information receiving module is required. In contrast, the method in FIG. 5 includes a step of receiving information, obviating the stand-alone information receiving module.

FIG. 6 is a flow chat illustrating a method of presenting a user interface object in some embodiments according to the present disclosure. Referring to FIG. 6, the method of presenting a user interface object includes providing data to a display panel of an electronic device having a memory and one or more processors to concurrently display a user interface having a plurality of user interface objects. The plurality of user interface objects include a plurality of menu user interface objects and a plurality of user interface control objects. The plurality of menu user interface objects include at least a first menu user interface object and a second menu user interface object. The plurality of user interface control objects include at least a first user interface control object and a second user interface control object. In some embodiments, the method of presenting a user interface object further includes generating a first triggering signal in response to a first user action including dragging the first menu user interface object to a position occupied by the first user interface control object, configuring the first user interface control object to correspond to the first menu user interface object in response to the first triggering signal, generating a second triggering signal in response to a second user action including dragging the second menu user interface object to a position occupied by the second user interface control object, and configuring the second user interface control object to correspond to the second menu user interface object in response to the second triggering signal. In some embodiments, the plurality of menu user interface objects include one or more contact objects, and the plurality of user interface control objects include one or more messaging window objects. In some embodiments, the one or more messaging window objects include one or more input window objects. In some embodiments, the method of presenting a user interface object further includes generating a seventh triggering signal in response to a seventh user action including clicking on the one or more input window objects; and starting a user interface control object adjustment control in response to the seventh triggering signal.

In some embodiments, in response to the seventh user action, the operation activated starts a default input method control object for the user to input information. Because the method of presenting a user interface object is typically used in mobile terminals such as mobile phone, the size of the screen in these devices is extremely limited. Configuring too many user interface objects in the user interface may lead to poor user experience. For example, the input window objects may obstruct the messaging window objects, making it difficult for the user to see the messaging window objects. By having the user interface control object adjustment control in response to the seventh triggering signal, a size of the respective one of the plurality of user interface control objects can be automatically adjusted. Optionally, the respective one of the plurality of user interface control may be automatically enlarged in its size. Optionally, the user can manually adjust the size of the respective one of the plurality of user interface control objects. The embodiments disclosed in the present disclosure enhance the user experience of the plurality of user interface objects by activating the user interface control object adjustment.

In some embodiments, the method generates an input window object (e.g., inputting messaging information) shared by two or more messaging window objects, so that the user may use a same input window object to communicate with two or more contacts. In one example, the method generates at least three of the plurality of the user interface control objects on the screen including the first messaging window object, the second messaging window object, and the input window object shared by the first messaging window object and the second messaging window object. Optionally, respective sizes of the first messaging window object, the second messaging window object, and the input window object are automatically adjusted to fit the screen. Optionally, respective sizes of the first messaging window object, the second messaging window object, and the input window object can be manually adjusted. In another example, when the input window object is activated by clicking the input window object of the first messaging window object, the second messaging window object is shrunk to the minimal size. In another example, when the input window object is activated by clicking the input window object of the second messaging window object, the first messaging window object is shrunk to the minimal size.

Figure 7:
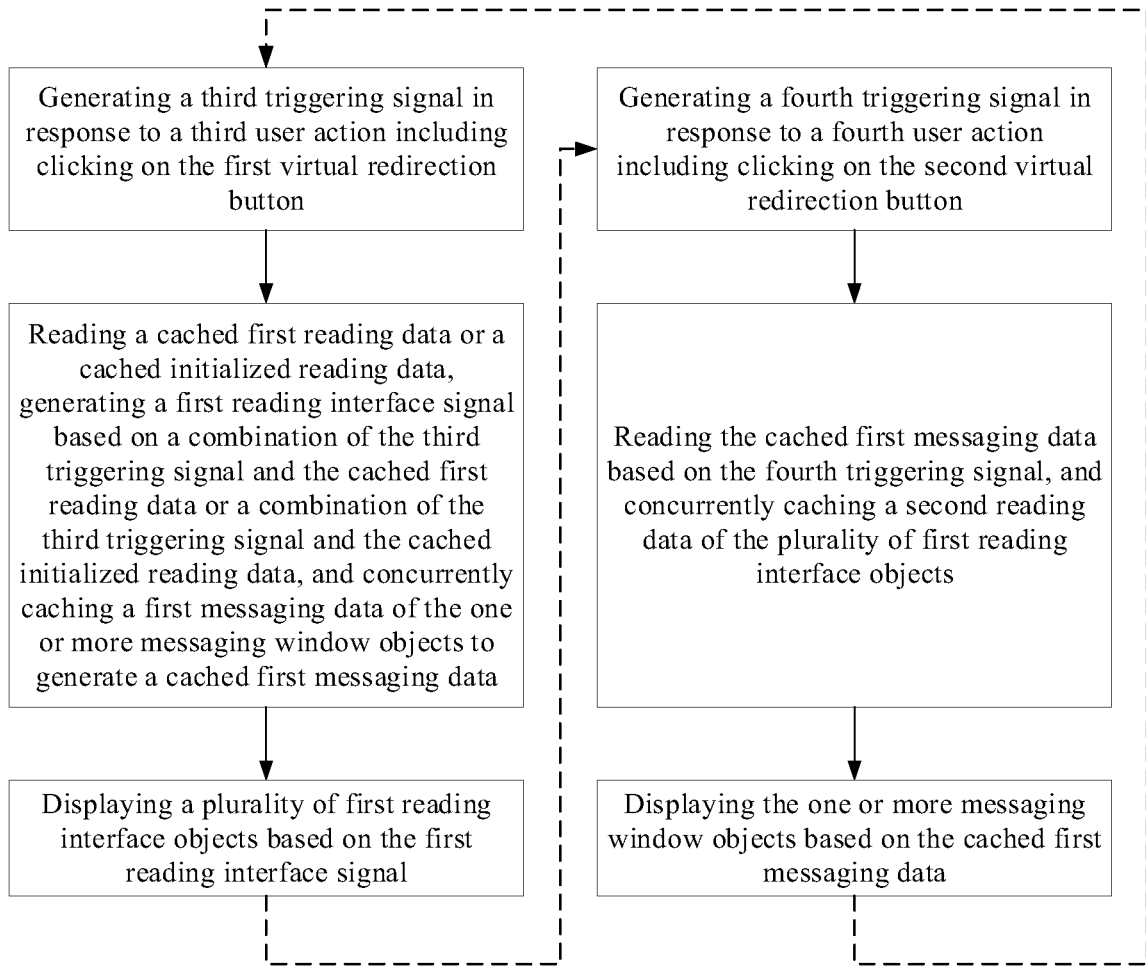
FIG. 7 is a flow chat illustrating a method of switching between a user interface object and a reading interface object in sonic embodiments according to the present disclosure.

FIG. 7 is a flow chat illustrating a method of switching between a user interface object and a reading interface object in some embodiments according to the present disclosure. Referring to FIG. 7, the plurality of user interface control objects further include a first virtual redirection button (e.g., a "reading" redirection button in WeChat®). In some embodiments, the method of switching between a user interface object and a reading interface object further includes generating a third triggering signal in response to a third user action including clicking on the first virtual redirection button; reading a cached first reading data or a cached initialized reading data, generating a first reading interface signal based on a combination of the third triggering signal and the cached first reading data or a combination of the third triggering signal and the cached initialized reading data, and concurrently caching a first messaging data of the one or more messaging window objects to generate a cached first messaging data; and displaying a plurality of first reading interface objects based on the first reading interface signal.

In some embodiments, the plurality of reading interface object include a second virtual redirection button. In some embodiments, the method of switching between a user interface object and a reading interface object further includes generating a fourth triggering signal in response to a fourth user action including clicking on the second virtual redirection button; reading the cached first messaging data based on the fourth triggering signal, and concurrently caching a second reading data of the plurality of first reading interface objects; and displaying the one or more messaging window objects based on the cached first messaging data.

In some embodiments, the first virtual redirection button is a "reading" button in a menu bar object. In some embodiments, the second virtual redirection button is a "chats" button in the menu bar object. Optionally, the first virtual redirection button is the "chats" button in the menu bar object, and the second virtual redirection button is a "reading" button in a menu bar object. Optionally, the first virtual redirection button can be configured as other types of buttons, for example, a "public platform" button of a plurality of public platform objects. Optionally, the second virtual redirection button can be configured as an exit button or a home button.

For example, when the user clicks a reading button of a menu bar object, a touch sensor senses the third user action of clicking the reading button and thereby sends a third notification to a processor. In response to the third notification, the processor caches a first messaging data of one or more messaging window objects to generate a cached first messaging data and reads a cached first reading data or a cached initialized reading data. Optionally, when the cached first reading data cannot be obtained, the processor can visit the reading platform to obtain the cached initialized reading data and generates a first reading interface signal based on a combination of the third triggering signal and the cached initialized reading data, thereby the plurality of first reading interface objects based on the first reading interface signal can be displayed. Optionally, when the cached first reading data is obtained, the processor generates a first reading interface signal based on a combination of the third triggering signal and the cached first reading data, thereby the plurality of first reading interface objects based on the first reading interface signal can be displayed. Optionally, a display panel displays the one of the plurality of first reading interface objects.

In another example, when the user clicks the second virtual redirection button, the touch sensor senses the fourth user action of clicking the second virtual redirection button and thereby sends a fourth notification to the processor. In response to the fourth notification, the processor caches a second reading data of the plurality of first reading interface and reads the cached first messaging data. Optionally, when the cached first messaging data is obtained, the processor generates one or more messaging window objects based on the cached first messaging data. Optionally, the display panel displays the one or more messaging window objects based on the previously cached messaging data.

The present disclosure provides a convenience way to switch between a user interface object and a reading interface object by respectively caching and reading data in both the messaging window objects and the first reading interface objects, obviating the needs for locating the contact and the previous reading progress.

Figure 8:
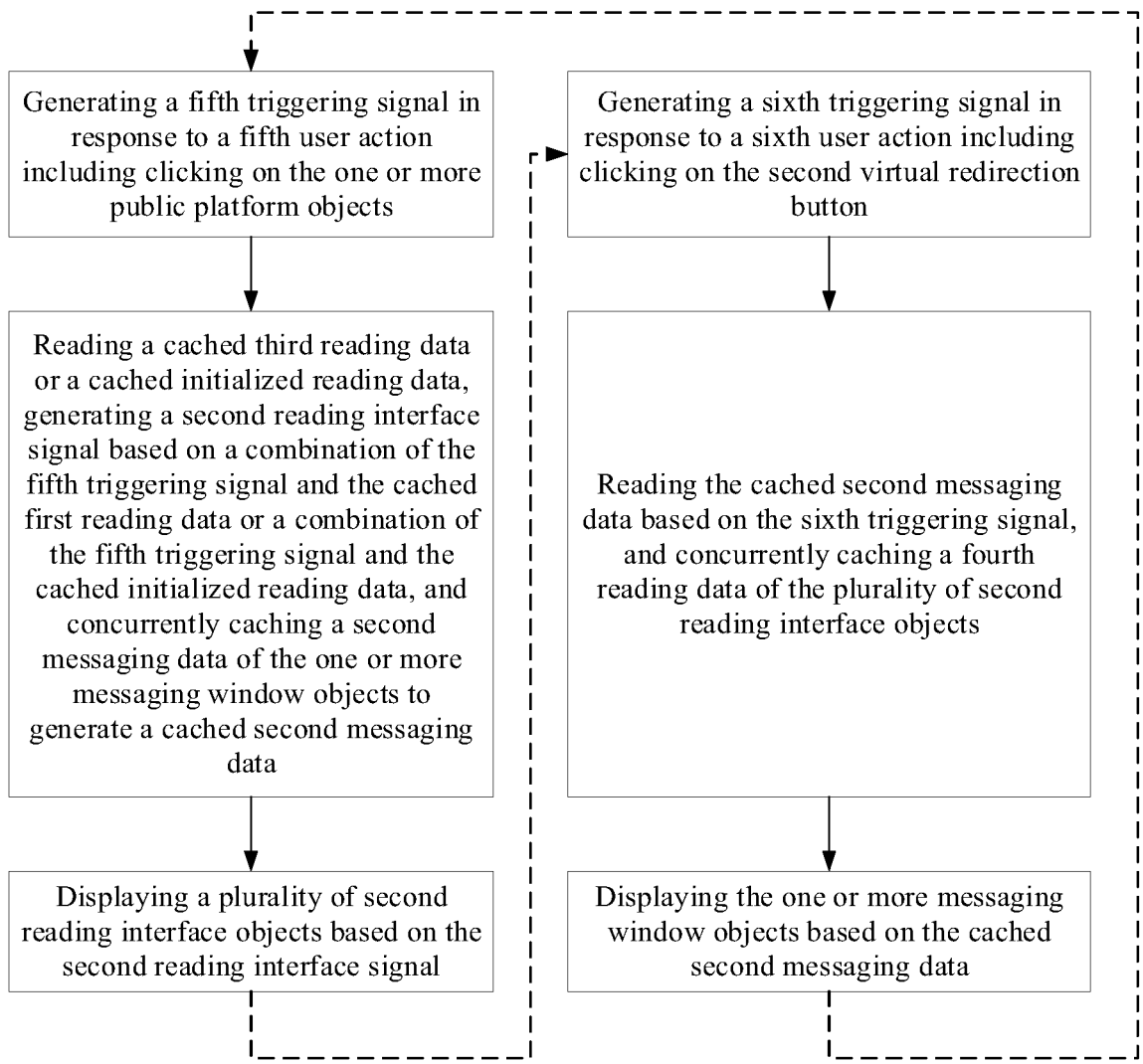
FIG. 8 is a flow chat illustrating a method of switching between a user interface object and a reading interface object in some embodiments according to the present disclosure.

FIG. 8 is a flow chat illustrating a method of switching between a user interface object and a reading interface object in some embodiments according to the present disclosure. Referring to FIG. 8, the plurality of menu user interface objects further include one or more public platform objects. In some embodiments, the method of switching between a user interface object and a reading interface object further includes generating a fifth triggering signal in response to a fifth user action including clicking on the one or more public platform objects; reading a cached third reading data or a cached initialized reading data, generating a second reading interface signal based on a combination of the fifth triggering signal and the cached first reading data or a combination of the fifth triggering signal and the cached initialized reading data, and concurrently caching a second messaging data of the one or more messaging window objects to generate a cached second messaging data; and displaying a plurality of second reading interface objects based on the second reading interface signal. In some embodiments, the method of switching between a user interface object and a reading interface object further includes generating a sixth triggering signal in response to a sixth user action including clicking on the second virtual redirection button; reading the cached second messaging data based on the sixth triggering signal, and concurrently caching a fourth reading data of the plurality of second reading interface objects; and displaying the one or more messaging window objects based on the cached second messaging data.

For example, when the user clicks a public platform button Q of a plurality of public platform objects, a touch sensor senses the fifth user action of clicking a public platform button Q and thereby sends a fifth notification to a processor. In response to the fifth notification, the processor caches a second messaging data of one or more messaging window objects to generate a cached second messaging data and reads a cached third reading data or a cached initialized reading data. Optionally, when the cached second reading data cannot be obtained, the processor can visit the public platform to obtain the cached initialized reading data and generates a second reading interface signal based on a combination of the fifth triggering signal and the cached initialized reading data, thereby the plurality of second reading interface objects based on the second reading interface signal can be displayed. Optionally, when the cached third reading data is obtained, the processor generates a second reading interface signal based on a combination of the fifth triggering signal and the cached third reading data, thereby the plurality of second reading interface objects based on the second reading interface signal can be displayed. Optionally, a display panel displays the one of the plurality of first reading interface objects.

In another example, when the user clicks the second virtual redirection button, the touch sensor senses the sixth user action of clicking the second virtual redirection button and thereby sends a sixth notification to the processor. In response to the sixth notification, the processor caches a fourth reading data of the plurality of second reading interface and reads the cached second messaging data. Optionally, when the cached second messaging data is obtained, the processor generates one or more messaging window objects based on the cached second messaging data. Optionally, the display panel displays the one or more messaging window objects based on the cached second messaging data.

In another example, when the user clicks the second virtual redirection button, the touch sensor senses the fourth user action of clicking the second virtual redirection button and thereby sends a fourth notification to the processor. In response to the fourth notification, the processor caches a second reading data of the plurality of first reading interface and reads the cached first messaging data. Optionally, when the cached first messaging data is obtained, the processor generates one or more messaging window objects based on the cached first messaging data. Optionally, the display panel displays the one or more messaging window objects based on the previously cached messaging data.

Figure 9:
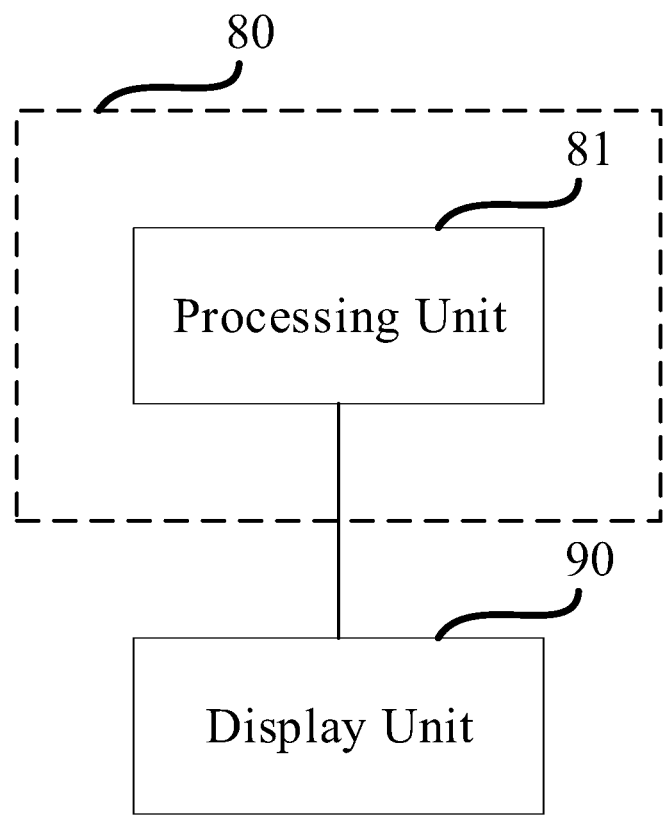
FIG. 9 is a schematic diagram illustrating the structure of an electronic apparatus in some embodiments according to the present disclosure.

FIG. 9 is a schematic diagram illustrating the structure of an electronic apparatus in some embodiments according to the present disclosure. Referring to FIG. 9, an electronic apparatus 80 includes a processing unit 81. The processing unit 81 is configured to provide data to a display panel of an electronic device having a memory and one or more processors to concurrently display a plurality of user interface objects in a user interface. The plurality of user interface objects include a plurality of menu user interface objects and a plurality of user interface control objects. The plurality of menu user interface objects include at least a first menu user interface object and a second menu user interface object. The plurality of user interface control objects include at least a first user interface control object and a second user interface control object. When the display unit displays the user interface, the processing unit 81 is further configured to generate a first triggering signal in response to a first user action including dragging the first menu user interface object to a position occupied by the first user interface control object; configure the first user interface control object to correspond to the first menu user interface object in response to the first triggering signal; generate a second triggering signal in response to a second user action including dragging the second menu user interface object to a position occupied by the second user interface control object; and configure the second user interface control object to correspond to the second menu user interface object in response to the second triggering signal.

In some embodiments, referring to FIG. 9, the processing unit 81 is a central processing unit, a display unit 90 is a display panel, the processing unit 81 and the display unit 90 is connected for communication. Optionally, the display units may be integrated in the electronic apparatus 80. Optionally, the processing unit 81 can be configured to be different types of processors, such as a single chip microcomputer. Optionally, the display unit 90 can be configured to be different types of display devices. The principle of presenting a user interface object in the electronic apparatus 80 is illustrated in FIG. 2.

In some embodiments, the plurality of menu user interface objects include one or more contact objects, and the plurality of user interface control objects include one or more messaging window objects and a first virtual redirection button. The processing unit 81 is configured to generate a third triggering signal in response to a third user action including clicking on the first virtual redirection button; to read a cached first reading data or a cached initialized reading data, generating a first reading interface signal based on a combination of the third triggering signal and the cached first reading data or a combination of the third triggering signal and the cached initialized reading data, and concurrently caching a first messaging data of the one or more messaging window objects to generate a cached first messaging data; and to display a plurality of first reading interface objects based on the first reading interface signal. In some embodiments, the plurality of reading interface object include a second virtual redirection button. The processing unit 81 is configured to generate a fourth triggering signal in response to a fourth user action including clicking on the second virtual redirection button; to read the cached first messaging data based on the fourth triggering signal, and concurrently caching a second reading data of the plurality of first reading interface objects; and to display the one or more messaging window objects based on the cached first messaging data. The principle of switching between a user interface object and a reading interface object in the electronic apparatus 80 is illustrated in FIG. 7.

In some embodiments, the plurality of menu user interface objects further include one or more public platform objects. The processing unit 81 is configured to generate a fifth triggering signal in response to a fifth user action including clicking on the one or more public platform objects; to read a cached third reading data or a cached initialized reading data, generating a second reading interface signal based on a combination of the fifth triggering signal and the cached first reading data or a combination of the fifth triggering signal and the cached initialized reading data, and concurrently caching a second messaging data of the one or more messaging window objects to generate a cached second messaging data; and to display a plurality of second reading interface objects based on the second reading interface signal. In some embodiments, the processing unit 81 is configured to generating a sixth triggering signal in response to a sixth user action including clicking on the second virtual redirection button; to read the cached second messaging data based on the sixth triggering signal, and concurrently caching a fourth reading data of the plurality of second reading interface objects; and to display the one or more messaging window objects based on the cached second messaging data. The principle of switching between a user interface object and a reading interface object in the electronic apparatus 80 is illustrated in FIG. 8.

In some embodiments, the first user interface control object is a main user interface control object, the second user interface control object is a subordinate user interface control object; and the first user interface control object and the second user interface control object are adjacent to each other. In some embodiments, the processing unit 81 is configured to receive a messaging signal from the one or more contact objects; and display the messaging signal in a respective one of the one or more messaging window objects. In some embodiments, the processing unit 81 is configured to reset the plurality of user interface control objects upon a user logging on successfully. The principles of presenting a user interface object in the electronic apparatus 80 is illustrated in FIGS. 4 to 6.

In some embodiments, the methods mentioned to presenting a user interface object can be performed by computer software. In some embodiments, the present disclosure includes a computer software product including a computer program tangibly embodied on a machine readable medium. Optionally, the computer program includes the program code executing the method presenting a user interface object. Optionally, the computer program can be downloaded and installed from the network via the communication portion. Optionally, the computer program can be installed from the removable medium.

In another aspect, the present disclosure further provides an apparatus for presenting a user interface object. In some embodiments, the apparatus for presenting a user interface object includes a memory; and one or more processors. The memory and the one or more processors are connected with each other. The memory stores computer-executable instructions for controlling the one or more processors to provide data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object; generate a first triggering signal in response to a first user action comprising dragging the first menu user interface object to a position occupied by the first user interface control object; configure the first user interface control object to correspond to the first menu user interface object in response to the first triggering signal; generate a second triggering signal in response to a second user action comprising dragging the second menu user interface object to a position occupied by the second user interface control object; and configure the second user interface control object to correspond to the second menu user interface object in response to the second triggering signal.

In some embodiments, the plurality of menu user interface objects include one or more contact objects, the plurality of user interface control objects include one or more messaging window objects, and the plurality of user interface control objects further comprise a first virtual redirection button. The memory further stores computer-executable instructions for controlling the one or more processors to generate a third triggering signal in response to a third user action comprising clicking on the first virtual redirection button; and read a cached first reading data or a cached initialized reading data, generating a first reading interface signal based on a combination of the third triggering signal and the cached first reading data or a combination of the third triggering signal and the cached initialized reading data, and concurrently caching a first messaging data of the one or more messaging window Objects to generate a cached first messaging data. Optionally, the apparatus for presenting a. user interface object further includes a display panel configured to display a plurality of first reading interface objects based on the first reading interface signal.

In some embodiments, the plurality of reading interface object comprising a second virtual redirection button. Optionally, the memory further stores computer-executable instructions for controlling the one or more processors to generate a fourth triggering signal in response to a fourth user action comprising clicking on the second virtual redirection button; and read the cached first messaging data based on the fourth triggering signal, and concurrently caching a second reading data of the plurality of first reading interface objects, Optionally, the display panel is configured to display the one or more messaging window objects based on the cached first messaging data.

In some embodiments, the plurality of menu user interface objects further comprises one or more public platform objects. Optionally, the memory further stores computer-executable instructions for controlling the one or more processors to generate a fifth triggering signal in response to a fifth user action comprising clicking on the one or more public platform objects; and read a cached third reading data or a cached initialized reading data, generating a second reading interface signal based on a combination of the fifth triggering signal and the cached third reading data or a combination of the fifth triggering signal and the cached initialized reading data, and concurrently caching a second messaging data of the one or more messaging window objects to generate a cached second messaging data. Optionally, the display panel is configured to display a plurality of second reading interface objects based on the second reading interface signal.

In some embodiments, the memory further stores computer-executable instructions for controlling the one or more processors to generate a sixth triggering signal in response to a sixth user action comprising clicking on the second virtual redirection button; and read the cached second messaging data based on the sixth triggering signal, and concurrently caching a fourth reading data of the plurality of second reading interface objects. Optionally, the display panel is configured to display the one or more messaging window objects based on the cached second messaging data.

In some embodiments, the first user interface control object is a main user interface control object; the second user interface control object is a subordinate user interface control object; and the first user interface control object and the second user interface control object are adjacent to each other.

In some embodiments, the one or more messaging window objects comprises one or more input window objects. Optionally, the memory further stores computer-executable instructions for controlling the one or more processors to generate a seventh triggering signal in response to a seventh user action comprising clicking on the one or more input window objects; and start a user interface control object adjustment control in response to the seventh triggering signal.

In some embodiments, the memory further stores computer-executable instructions for controlling the one or more processors to receive a messaging signal from the one or more contact objects. Optionally, the display panel is configured to display the messaging signal in a respective one of the one or more messaging window objects.

in some embodiments, the memory further stores computer-executable instructions for controlling the one or more processors to reset the plurality of user interface control objects upon a user logging on successfully.

In some embodiments, the present disclosure includes a computer readable storage medium. Optionally, the computer readable storage medium can be assembled in the above electronic apparatus. Optionally, the computer readable storage medium can be independent from the electronic apparatus and not be assembled into the electronic apparatus. Optionally, the computer readable storage medium can store one or more programs, wherein the one or more programs are used by one or more processors to present user interface objects.

In another aspect, the present disclosure further provides a computer-program product including a non-transitory tangible computer-readable medium having computer-readable instructions thereon. The computer-readable instructions are executable by a processor to cause the processor to perform providing data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object; generating a first triggering signal in response to a first user action comprising dragging the first menu user interface object to a position occupied by the first user interface control object; configuring the first user interface control object to correspond to the first menu user interface object in response to the first triggering signal; generating a second triggering signal in response to a second user action comprising dragging the second menu user interface object to a position occupied by the second user interface control object; and configuring the second user interface control object to correspond to the second menu user interface object in response to the second triggering signal.

In some embodiments, the plurality of menu user interface objects comprise one or more contact objects, and the plurality of user interface control objects comprise one or more messaging window objects. Optionally, the plurality of user interface control objects further comprise a first virtual redirection button. Optionally, the computer-readable instructions are executable by a processor to further cause the processor to perform generating a third triggering signal in response to a third user action comprising clicking on the first virtual redirection button; reading a cached first reading data or a cached initialized reading data, generating a first reading interface signal based on a combination of the third triggering signal and the cached first reading data or a combination of the third triggering signal and the cached initialized reading data, and concurrently caching a first messaging data of the one or more messaging window objects to generate a cached first messaging data.

In some embodiments, the plurality of reading interface object comprising a second virtual redirection button. Optionally, the computer-readable instructions are executable by a processor to further cause the processor to perform generating a fourth triggering signal in response to a fourth user action comprising clicking on the second virtual redirection button; and reading the cached first messaging data based on the fourth triggering signal, and concurrently caching a second reading data of the plurality of first reading interface objects.

In some embodiments, the plurality of menu user interface objects further comprises one or more public platform objects. Optionally, the computer-readable instructions are executable by a processor to further cause the processor to perform generating a fifth triggering signal in response to a fifth user action comprising clicking on the one or more public platform objects; and reading a cached third reading data or a cached initialized reading data, generating a second reading interface signal based on a combination of the fifth triggering signal and the cached third reading data or a combination of the fifth triggering signal and the cached initialized reading data, and concurrently caching a second messaging data of the one or more messaging window objects to generate a cached second messaging data.

In some embodiments, the computer-readable instructions are executable by a processor to further cause the processor to perform generating a sixth triggering signal in response to a sixth user action comprising clicking on the second virtual redirection button; and reading the cached second messaging data based on the sixth triggering signal, and concurrently caching a fourth reading data of the plurality of second reading interface objects.

In some embodiments, the first user interface control object is a main user interface control object; the second user interface control object is a subordinate user interface control object; and the first user interface control object and the second user interface control object are adjacent to each other.

In some embodiments, the one or more messaging window objects comprises one or more input window objects. Optionally, the computer-readable instructions are executable by a processor to further cause the processor to perform generating a seventh triggering signal in response to a seventh user action comprising clicking on the one or more input window objects; and starting a user interface control object adjustment control in response to the seventh triggering signal.

In some embodiments, the computer-readable instructions are executable by a processor to further cause the processor to perform receiving a messaging signal from the one or more contact objects.

In some embodiments, the computer-readable instructions are executable by a processor to further cause the processor to perform resetting the plurality of user interface control objects upon a user logging on successfully.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of presenting a user interface object, comprising:
    providing data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object, a first virtual redirection button, and a second virtual redirection button;
    generating a first triggering signal in response to a first user action comprising dragging the first menu user interface object to a position occupied by the first user interface control object;
    configuring the first user interface control object to correspond to the first menu user interface object in response to the first triggering signal;
    generating a second triggering signal in response to a second user action comprising dragging the second menu user interface object to a position occupied by the second user interface control object; and
    configuring the second user interface control object to correspond to the second menu user interface object in response to the second triggering signal;
    wherein the method further comprises, in a same user interface, switching between displaying one or more messaging window objects and displaying one or more first reading interface objects;
    wherein switching from displaying the one or more messaging window objects to displaying the one or more first reading interface objects, in the same user interface, comprises:
    generating a third triggering signal in response to a third user action comprising clicking on the first virtual redirection button;
    reading a cached first reading data or a cached initialized reading data, generating a first reading interface signal based on a combination of the third triggering signal and the cached first reading data or a combination of the third triggering signal and the cached initialized reading data, and concurrently caching a first messaging data of one or more messaging window objects to generate a cached first messaging data in the memory of the electronic device; and
    displaying one or more first reading interface objects based on the first reading interface signal;
    wherein switching from displaying the one or more first reading interface objects to displaying the one or more messaging window objects, in the same user interface, comprises:
    generating a fourth triggering signal in response to a fourth user action comprising clicking on the second virtual redirection button;
    reading the cached first messaging data based on the fourth triggering signal, and concurrently caching a second reading data of the one or more first reading interface objects in the memory of the electronic device; and
    displaying the one or more messaging window objects based on the cached first messaging data in the memory of the electronic device.

2. The method of claim 1, wherein the plurality of menu user interface objects comprise one or more contact objects, and the plurality of user interface control objects comprise one or more messaging window objects.

3. The method of claim 1, wherein the plurality of menu user interface objects further comprises one or more public platform objects;
    wherein the method further comprises, in a same user interface, switching between displaying the one or more messaging window objects and displaying the one or more public platform objects;
    wherein switching from displaying the one or more messaging window objects to displaying the one or more public platform objects, in the same user interface, comprises:

generating a fifth triggering signal in response to a fifth user action comprising clicking on the one or more public platform objects;

reading a cached third reading data or a cached initialized reading data, generating a second reading interface signal based on a combination of the fifth triggering signal and the cached third reading data or a combination of the fifth triggering signal and the cached initialized reading data, and concurrently caching a second messaging data of the one or more messaging window objects to generate a cached second messaging data in the memory of the electronic device; and displaying a plurality of second reading interface objects based on the second reading interface signal;

wherein switching from displaying the one or more public platform objects to displaying the one or more messaging window objects, in the same user interface, comprises:

generating a sixth triggering signal in response to a sixth user action comprising clicking on the second virtual redirection button;

reading the cached second messaging data based on the sixth triggering signal, and concurrently caching a fourth reading data of the plurality of second reading interface objects in the memory of the electronic device; and displaying the one or more messaging window objects based on the cached second messaging data in the memory of the electronic device.

4. The method of claim 1, wherein the first user interface control object is a main user interface control object;
the second user interface control object is a subordinate user interface control object; and
the first user interface control object and the second user interface control object are adjacent to each other.

5. The method of claim 2, wherein the one or more messaging window objects comprises one or more input window objects;
wherein the method further comprises:
generating a seventh triggering signal in response to a seventh user action comprising clicking on the one or more input window objects; and
starting a user interface control object adjustment control in response to the seventh triggering signal to adjust a size of a respective messaging window object.

6. The method of claim 2, further comprising:
receiving a messaging signal from the one or more contact objects; and
displaying the messaging signal in a respective one of the one or more messaging window objects.

7. The method of claim 1, further comprising resetting the plurality of user interface control objects upon a user logging on successfully.

8. An apparatus for presenting a user interface object, comprising:
a display panel;
a memory; and
one or more processors;
wherein the memory and the one or more processors are connected with each other; and
the memory stores computer-executable instructions for controlling the one or more processors to:
provide data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object, a first virtual redirection button, and a second virtual redirection button;

generate a first triggering signal in response to a first user action comprising dragging the first menu user interface object to a position occupied by the first user interface control object;

configure the first user interface control object to correspond to the first menu user interface object in response to the first triggering signal;

generate a second triggering signal in response to a second user action comprising dragging the second menu user interface object to a position occupied by the second user interface control object; and configure the second user interface control object to correspond to the second menu user interface object in response to the second triggering signal;

wherein the memory further stores computer-executable instructions for controlling the one or more processors to, in a same user interface, switch between displaying one or more messaging window objects and displaying one or more first reading interface objects;

wherein switching from displaying the one or more messaging window objects to displaying the one or more first reading interface objects, in the same user interface, comprises:

generating a third triggering signal in response to a third user action comprising clicking on the first virtual redirection button;

reading a cached first reading data or a cached initialized reading data, generating a first reading interface signal based on a combination of the third triggering signal and the cached first reading data or a combination of the third triggering signal and the cached initialized reading data, and concurrently caching a first messaging data of one or more messaging window objects to generate a cached first messaging data in the memory of the electronic device; and displaying one or more first reading interface objects based on the first reading interface signal;

wherein switching from displaying the one or more first reading interface objects to displaying the one or more messaging window objects, in the same user interface, comprises:

generating a fourth triggering signal in response to a fourth user action comprising clicking on the second virtual redirection button;

reading the cached first messaging data based on the fourth triggering signal, and concurrently caching a second reading data of the one or more first reading interface objects in the memory of the electronic device; and displaying the one or more messaging window objects based on the cached first messaging data in the memory of the electronic device.

9. The apparatus of claim 8, wherein the plurality of menu user interface objects comprise one or more contact objects; and
the plurality of user interface control objects comprise one or more messaging window objects.

10. The apparatus of claim 8, wherein the plurality of menu user interface objects further comprises one or more public platform objects;

wherein the memory further stores computer-executable instructions for controlling the one or more processors to, in a same user interface, switch between displaying the one or more messaging window objects and displaying the one or more public platform objects;

wherein switching from displaying the one or more messaging window objects to displaying the one or more public platform objects, in the same user interface, comprises:

generating a fifth triggering signal in response to a fifth user action comprising clicking on the one or more public platform objects; and reading a cached third reading data or a cached initialized reading data, generating a second reading interface signal based on a combination of the fifth triggering signal and the cached third reading data or a combination of the fifth triggering signal and the cached initialized reading data, and concurrently caching a second messaging data of the one or more messaging window objects to generate a cached second messaging data in the memory of the electronic device;

wherein the display panel is configured to display a plurality of second reading interface objects based on the second reading interface signal;

wherein switching from displaying the one or more public platform objects to displaying the one or more messaging window objects, in the same user interface, comprises:

generating a sixth triggering signal in response to a sixth user action comprising clicking on the second virtual redirection button; and reading the cached second messaging data based on the sixth triggering signal, and concurrently caching a fourth reading data of the plurality of second reading interface objects in the memory of the electronic device;

wherein the display panel is configured to display the one or more messaging window objects based on the cached second messaging data in the memory of the electronic device.

11. The apparatus of claim 8, wherein the first user interface control object is a main user interface control object;

the second user interface control object is a subordinate user interface control object; and the first user interface control object and the second user interface control object are adjacent to each other.

12. The apparatus of claim 9, wherein the one or more messaging window objects comprises one or more input window objects;

wherein the memory further stores computer-executable instructions for controlling the one or more processors to:

generate a seventh triggering signal in response to a seventh user action comprising clicking on the one or more input window objects; and start a user interface control object adjustment control in response to the seventh triggering signal to adjust a size of a respective messaging window object.

13. The apparatus of claim 9, wherein the memory further stores computer-executable instructions for controlling the one or more processors to receive a messaging signal from the one or more contact objects;

wherein the display panel is configured to display the messaging signal in a respective one of the one or more messaging window objects.

14. The apparatus of claim 8, wherein the memory further stores computer-executable instructions for controlling the one or more processors to reset the plurality of user interface control objects upon a user logging on successfully.

15. A computer-program product comprising a non-transitory tangible computer-readable medium having computer-readable instructions thereon, the computer-readable instructions being executable by a processor to cause the processor to perform:

providing data to a display panel of an electronic device having a memory and one or more processors to concurrently display a plurality of user interface objects in a user interface, the plurality of user interface objects comprising a plurality of menu user interface objects and a plurality of user interface control objects, the plurality of menu user interface objects comprising at least a first menu user interface object and a second menu user interface object, and the plurality of user interface control objects comprising at least a first user interface control object and a second user interface control object, a first virtual redirection button, and a second virtual redirection button;

generating a first triggering signal in response to a first user action comprising dragging the first menu user interface object to a position occupied by the first user interface control object;

configuring the first user interface control object to correspond to the first menu user interface object in response to the first triggering signal;

generating a second triggering signal in response to a second user action comprising dragging the second menu user interface object to a position occupied by the second user interface control object; and configuring the second user interface control object to correspond to the second menu user interface object in response to the second triggering signal;

wherein the computer-readable instructions is executable by a processor to cause the processor to further perform, in a same user interface, switching between displaying one or more messaging window objects and displaying one or more first reading interface objects;

wherein switching from displaying the one or more messaging window objects to displaying the one or more first reading interface objects, in the same user interface, comprises:

generating a third triggering signal in response to a third user action comprising clicking on the first virtual redirection button;

reading a cached first reading data or a cached initialized reading data, generating a first reading interface signal based on a combination of the third triggering signal and the cached first reading data or a combination of the third triggering signal and the cached initialized reading data, and concurrently caching a first messaging data of one or more messaging window objects to generate a cached first messaging data in the memory of the electronic device; and displaying one or more first reading interface objects based on the first reading interface signal;

wherein switching from displaying the one or more first reading interface objects to displaying the one or more messaging window objects, in the same user interface, comprises:

generating a fourth triggering signal in response to a fourth user action comprising clicking on the second virtual redirection button;

reading the cached first messaging data based on the fourth triggering signal, and concurrently caching a second reading data of the one or more first reading interface objects in the memory of the electronic device; and displaying the one or more messaging window objects based on the cached first messaging data in the memory of the electronic device.

\* \* \* \* \*